No. 638,548. Patented Dec. 5, 1899.
L. L. BILLAUDOT.
APPARATUS FOR MAKING PHOSPHORUS.
(Application filed Apr. 19, 1898.)
(No Model.) 2 Sheets—Sheet 1.
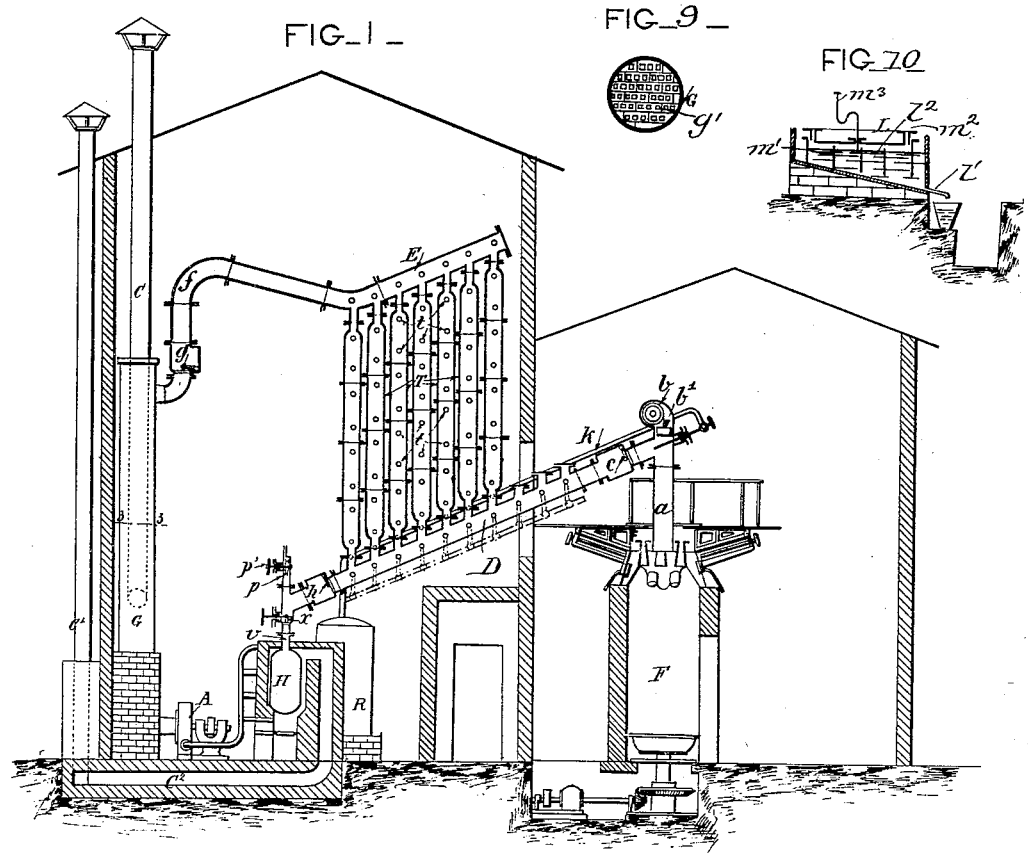
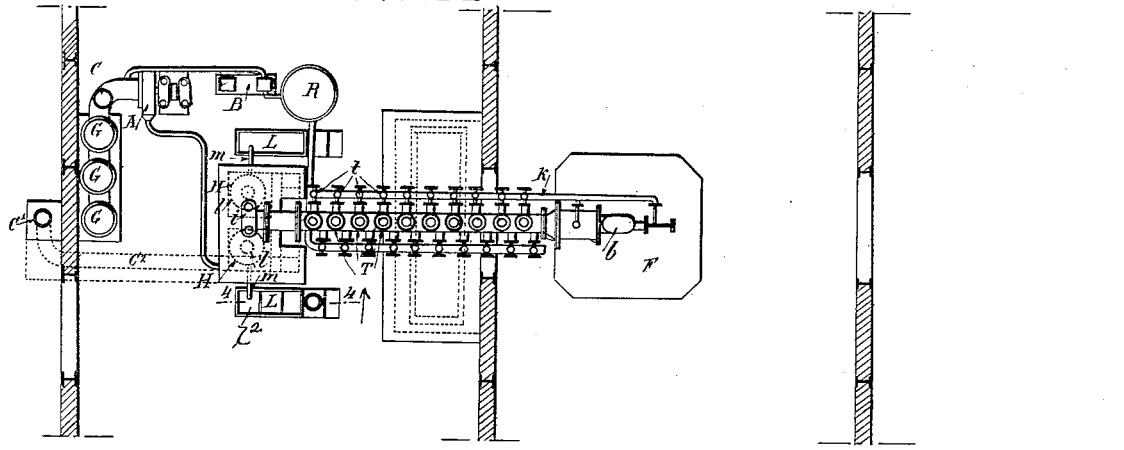

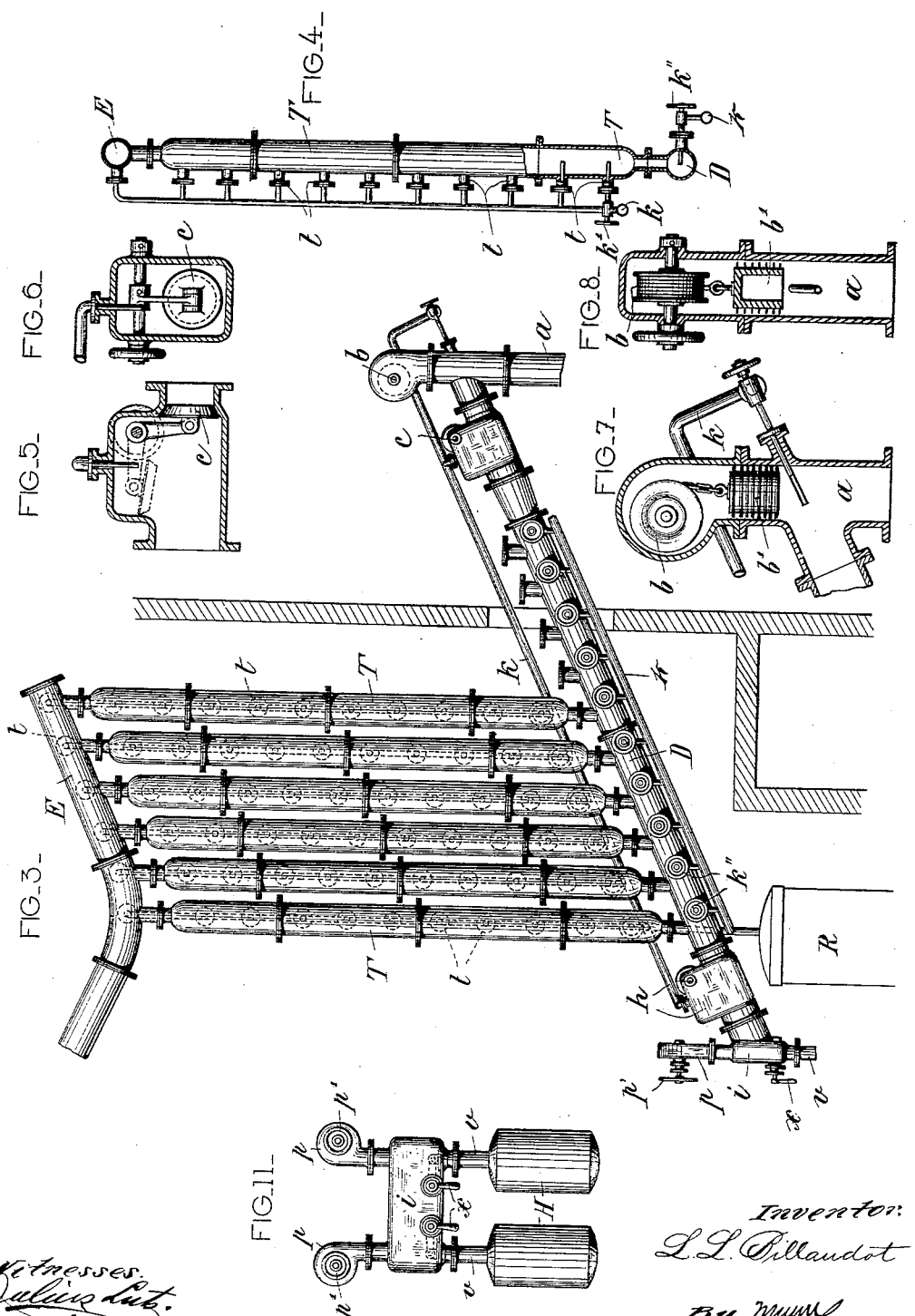

UNITED STATES PATENT OFFICE.

LOUIS LUCIEN BILLAUDOT, OF PARIS, FRANCE.

APPARATUS FOR MAKING PHOSPHORUS.

SPECIFICATION forming part of Letters Patent No. 638,548, dated December 5, 1899.

Application filed April 19, 1898. Serial No. 678,121. (No model.)

*To all whom it may concern:*

Be it known that I, LOUIS LUCIEN BILLAUDOT, manufacturer, of 16 Avenue Victoria, Paris, in the Republic of France, have invented certain new and useful Improvements in Apparatus for the Manufacture of Phosphorus, of which the following is a specification.

My invention relates to an apparatus for condensing and gathering phosphorus, the latter being produced in a vaporous state by any suitable method and either alone or mixed with gases.

The greater number of methods employed for the manufacture of phosphorus supply the same in a vaporous state and more or less diluted with gases, chiefly oxide of carbon. Such are the methods, for instance, which consist in reducing the phosphoric acid by means of carbon, or in treating the tricalcic phosphate by means of carbon and silica, or in treating the tricalcic phosphate by means of carbon in electric crucibles, calcium carbide being thus formed. Heretofore the condensation of the phosphorus thus mixed with gases has been effected by passing the mixture over water or causing it to bubble through the same. There are different objections to this method. The use of water causes more or less loss of the condensed phosphorus, and, in fact, in the presence of the water the phosphorus, being very finely divided, partially reacts, and the reaction is increased to a very large extent when several other products, carried along during the process, become added to the water, the quantity of free phosphorus being reduced to a corresponding extent. The water also leads to inconveniency in gathering the condensed phosphorus, because the phosphorus, being tainted by several products or materials treated and carried along during the operation, and more especially when the latter is rapidly proceeded with, can be obtained only by a filtration involving loss (the foreign materials still retaining some of the phosphorus) or by other methods, which are either difficult or also cause more or less of phosphorus.

My improved apparatus is characterized by the entire absence of any water from the condenser.

The procedure employed by me consists, essentially, in receiving the mixture of vaporous phosphorus and gases in receptacles of sufficient surface for the cooling processes and large enough to give the condensed particles of phosphorus time to become deposited on their inner walls, the deposit being assisted by the special shape of the receptacles, which have baffle boards or partitions to give different speeds to the gaseous current. In order to gather the condensed phosphorus, the dry mixture of phosphorus and foreign materials is then distilled in the said receptacles or in other receptacles.

The accompanying drawings show, by way of example, an apparatus for embodying my invention.

Figure 1 is a general view of the plant, partly in elevation and partly in section. Fig. 2 is a plan view of Fig. 1. Fig. 3 is an elevation of the condenser proper, looking in the direction indicated by the arrow in Fig. 2. Fig. 4 is an end view of the condenser with parts in section. Figs. 5 and 6 are respectively a longitudinal and a transverse vertical section of the valve located between the generator of phosphorus vapors (the crucible) and the condenser. Figs. 7 and 8 are sectional elevations in planes at a right angle to each other of the device for preventing a clogging of the pipes. Fig. 9 is a sectional plan of one of the condensing-towers on line 3 3 of Fig. 1. Fig. 10 is a vertical section of the collecting-tank on line 4 4 of Fig. 2, and Fig. 11 is an end view of two distilling-receptacles.

The above plant comprises, essentially, first, an electrical crucible; second, a condensing apparatus; third, a series of condensing-towers, and, fourth, a gathering apparatus.

*The electrical crucible.*—The electric crucible F comprised in the plant is of the common type, but modified in such a manner as to make it absolutely gas-tight to prevent any escape of the mixture of phosphorus vapors and gases and also to prevent the ingress of air, means being provided for conducting the said mixture into the condensing apparatuses.

*The condensing apparatus.*—The condensing apparatus is connected to the electrical crucible F by a vertical pipe $a$, provided at its upper part with a drum $b$, on which winds a chain adapted to raise and lower in the pipe $a$ a weight $b'$, having wings or scrapers, the object of which is to prevent the obstruction of the said pipe by the materials escaping from the crucible. At the entry of the condenser is a damper or valve c, by means of which the condenser can be isolated from the crucible.

The condensing apparatus comprises two inclined pipes D and E of the same cross-section and connected together by a series of vertical pipes T, the cross-section of which at their junction with the pipes D and E is so calculated as to give a total passage area equal to that of the pipe D or E in order that the gases may move at the same speed in each of the vertical pipes. Moreover, the upper device being the same as the lower device, but with the outlet of the pipe E opposite the inlet of the pipe D, the result is that the gases move a distance which is constant and thus move regularly into the pipe f. Thence they move through a second valve g, identical to the valve c, and by which the part of the condenser already described can be isolated from the devices to be described hereinafter.

A series of small pipes t are connected to the pipes D T E, comprising the condenser, the said small pipes having nozzles extending inward to the axial line of the said main pipes. By means of the small pipes t jets of gas can be discharged into the pipes D, T, and E, said jets following the same direction as the vapors in the pipe D, and being directed downward in the vertical pipes T and in the pipe E. The pipes t are connected at the outside to pipes which are, by sections, provided with stop-cocks $k'$. Each of the pipes t of the tube D is provided with a cock $k''$. Each series of pipes of each of the tubes T, as well as each of the pipes placed above each of the tubes T, in the tube E, is controlled by one and the same cock $k'$. Each of the said cocks is in communication with a main pipe K, connected to the receptacle R, and in communication, in its turn, with the compressing apparatus B, hereinafter described.

*The series of condensing-towers.*—The valve g is connected on the outlet side with a series of three towers G, provided with baffling-plates in the interior. The gases move through the said towers and are then conducted either to a suction device A, or a compressing device B, or a chimney C. At the end of the pipe D is a valve h, similar to those c and g, so that by means of the three valves c g h the group of condensing-pipes can be isolated from the other apparatuses.

*The gathering apparatuses.*— Connected with the valve h of the above-described condenser is a distributing-box i in communication with two distilling-receptacles H H. The said box i is provided at its upper part with two cleaning devices similar to the device b at the outlet of the electrical crucible and hereinafter referred to, and also with two valves, by means of which communication can be established with either of the receptacles H H through an upper pipe v. The receptacles H H are inclosed in masonry comprising a heating apparatus operating by combustion of the gas coming from the suction device A. The said receptacles are provided with a manhole l at the top and with a pipe m, by means of which the receptacles are put in communication with the tank L, intended for gathering the distilled phosphorus. The tank L comprises an outer casing lined with lead and provided with an inclined bottom, at the lowest point of which is located an outlet $l'$. A holder or inverted casing $l^2$ is located within the tank L and dips into water contained in the tank, thus forming a water seal. The casing $l^2$ is provided with a baffle-partition $m'$. At the opposite end to the pipe m the casing $l^2$ has a gas-discharge pipe $m^2$, and toward the center it carries a safety-pipe $m^3$.

Operation.

1. *The crucible.*—The materials to be treated are introduced into the electrical crucible F at the upper part of the same. The reaction is effected under the action of the arc, and the phosphorus vapors are given off mixed with oxide of carbon. The several solid materials carried off are deposited in part at the top of the crucible; but those which are deposited in the pipe a and which might in the end obstruct the same are now and then detached by operating the winged weight $b'$, which is done by means of a fly-wheel placed at the outside on an extension of the shaft of the drum b.

2. *Condenser.* — The phosphorus vapors and the gases moving on pass through the valve c, which is open, into the pipe D and then enter into the vertical tubes T to come together again in the pipe E, whence they move on to the valve g, also open. During the above movements the vapor of phosphorus becomes condensed by cooling, and the larger or smaller drops mixed with the solid materials carried along are deposited on the inner walls of the condenser and remain in the liquid state, for the room in which the apparatus is placed is heated, so that the said inner walls are maintained at a temperature of over 122° Fahrenheit. The said mixture, more or less liquid, flows by gravity toward the valve h. As sometimes the consistency of the said mixture of phosphorus and extraneous materials might reach a point preventing its easy flow, the latter is assisted now and then by sending rapid discharges of oxide of carbon under pressure through the smaller pipes jointed to the pipes t.

3. *Condensing-towers.*—The gases, freed of the greater part of the phosphorus vapors and of solid matter—that is to say, composed almost exclusively of oxide of carbon holding in suspension infinitively small particles of phosphorus—pass through the valve g and into the towers G, where they come in contact, on a very large surface, with a solution of a salt of copper, such as copper sulfate, which retains almost completely the last traces of phosphorus by forming copper phosphide, which is a product used in the arts. The solution may simply be poured into the towers G at the top. These towers contain perforated baffle-boards $g'$ to break up the gaseous current. On leaving the towers G the gases, almost completely composed of oxide of carbon, are sent, as desired, either to the chimney C or through the suction device A under the different heating devices operative by means of the combustion of oxide of carbon, which are used in my improved plant, or the said gases are compressed by means of the compressing apparatus B in a receptacle R, connected with the main pipe K, for sending the rapid discharges referred to in connection with the condenser.

4. *Gathering devices.*—As hereinbefore described, the condensed phosphorus, mixed with the extraneous matter, flows in the pipe D to the open valve $h$, through which it passes to the distributing-box $i$, whence the mixture is sent to either of the distilling-receptacles H by opening the corresponding valve $x$. The scraping device shown in Figs. 7 and 8, as applied to the pipe $a$, may also be applied to the receptacle H to keep the same clean, and to thus facilitate its filling by the condensed phosphorus coming from the pipe D. When the first receptacle is considered sufficiently full, the corresponding valve $x$ is closed and the condensed mixture is sent into the second receptacle H, operating in the same way. During the filling of the said second receptacle distillation in the first receptacle is proceeded with. For that purpose the carbon-oxide burners located under the said receptacle are lighted. The gases of combustion circulate around the receptacle and allow of raising the temperature to the required degree for distilling the phosphorus. The said gases finally escape through the flues $C^2$ and the chimney $C'$. The outflow of the phosphorus vapor is facilitated by means of a slight current of oxide of carbon, or, if necessary, of carbonic acid. The distilled phosphorus is gathered in the tank L, under water, the temperature of which is maintained above the melting-point of phosphorus. The phosphorus extracted from the tank will, if necessary, be passed through a filter to separate the small quantity of red phosphorus which may have become formed. The phosphorus is then sent to the molding and packing workshop. As the mixture subjected to distillation is composed of phosphorus, which alone is distillable, and of solid matter, which remains in the receptacle after distillation, the said solid matter is extracted through the manhole at the upper part of the distilling-receptacle H.

The operation is continued by distilling the product contained in the second receptacle H, proceeding in the same way and sending the phosphorus coming from the condenser again to the other receptacle which has become empty. Therefore the operation is only interrupted during the time necessary to empty the electrical crucible, the valves $c\,g\,h$ being kept closed.

The distilled phosphorus may be received when coming out of the receptacle into a series of casings or tanks placed in water or into any other apparatus, allowing the condensation of the phosphorus, while maintaining it out of contact with the surrounding air.

I claim as my invention and desire to secure by Letters Patent—

1. An apparatus for the recovery of phosphorus, comprising a gas-tight generator of phosphorus vapors, and a condenser connected thereto and consisting of superposed inclined tubes and upright tubes connecting them, the said upright tubes being reduced where they join the inclined tubes so that the aggregate cross-section of the connections is approximately equal to the cross-section of the inclined tube.

2. An apparatus for the recovery of phosphorus, comprising a gas-tight generator of phosphorus vapors, a valved pipe leading therefrom, and a condenser connected with said pipe and consisting of two inclined tubes connected by upright tubes.

3. An apparatus for the recovery of phosphorus, comprising a gas-tight generator of phosphorus vapors, and a condenser connected thereto and consisting of superposed inclined tubes and upright tubes connecting them, the said upright tubes being reduced where they join the inclined tubes so that the aggregate cross-section of the connections is approximately equal to the cross-section of the inclined tube, and a series of condensing-towers connected to the said condenser and containing baffle-partitions.

4. An apparatus for the recovery of phosphorus, comprising a gas-tight generator of phosphorus vapors, a condenser consisting of two inclined tubes connected by upright tubes provided with nozzles extending into them to the axis of said upright tubes, a suction device for withdrawing the oxide of carbon formed, an apparatus for compressing said oxide of carbon, and a connection from said compressor to the said nozzles.

5. An apparatus for the recovery of phosphorus, comprising a gas-tight generator of phosphorus vapors, an upright valved pipe leading from said generator, a scraper movable in said pipe, and a condenser connected with said pipe and consisting of two inclined tubes connected by upright tubes.

In witness whereof I have hereunto set my hand in presence of two witnesses.

LOUIS LUCIEN BILLAUDOT.

Witnesses:
GEORGE LAURENT,
EUGÉNE WATTIER.